(12) United States Patent
Yarch et al.

(10) Patent No.: US 8,909,862 B2
(45) Date of Patent: Dec. 9, 2014

(54) PROCESSING OUT OF ORDER TRANSACTIONS FOR MIRRORED SUBSYSTEMS USING A CACHE TO TRACK WRITE OPERATIONS

(75) Inventors: Mark A. Yarch, Chandler, AZ (US); Pankaj Kumar, Chandler, AZ (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 12/495,676

(22) Filed: Jun. 30, 2009

(65) Prior Publication Data

US 2010/0332756 A1    Dec. 30, 2010

(51) Int. Cl.
  *G06F 12/08*    (2006.01)
  *G06F 11/16*    (2006.01)
  *G06F 11/20*    (2006.01)

(52) U.S. Cl.
  CPC ............ *G06F 11/1666* (2013.01); *G06F 11/20* (2013.01); *G06F 2201/82* (2013.01)
  USPC .......................... 711/118; 711/141; 711/162

(58) Field of Classification Search
  None
  See application file for complete search history.

(56) References Cited

U.S. PATENT DOCUMENTS

| | | | | |
|---|---|---|---|---|
| 5,586,291 | A * | 12/1996 | Lasker et al. | 711/113 |
| 7,181,581 | B2 * | 2/2007 | Burkey | 711/161 |
| 7,266,653 | B2 * | 9/2007 | Tross et al. | 711/162 |
| 2003/0145136 | A1 * | 7/2003 | Tierney et al. | 710/3 |
| 2006/0064558 | A1 * | 3/2006 | Cochran et al. | 711/162 |
| 2008/0109565 | A1 * | 5/2008 | Ajanovic et al. | 710/8 |

* cited by examiner

*Primary Examiner* — Sanjiv Shah
*Assistant Examiner* — Glenn Gossage
(74) *Attorney, Agent, or Firm* — Caven & Aghevli LLC

(57) ABSTRACT

Methods and apparatus relating to processing out of order transactions for mirrored subsystems. A first device (that is mirroring data from a second device) includes a cache to track out of order write operations prior to writing data from the write operations to memory. A register may be used to track the state of the cache in response to receipt of a special transaction, which may be a posted transaction or snapshot. The first devise transmits an acknowledgement of commitment of the data to memory once all cache entries, as recorded at a select point by the register, are emptied or otherwise invalidated. Devices may communicate via a peripheral component interconnect express (PCIe) interconnect, and may include a point-to-point or serial link. Various components may be on the same integrated circuit die. An uninterrupted power supply or batteries may supply power in response to a power failure.

16 Claims, 5 Drawing Sheets

PROCESSING OUT OF ORDER TRANSACTIONS FOR MIRRORED SUBSYSTEMS USING A CACHE TO TRACK WRITE OPERATIONS

FIELD

The present disclosure generally relates to the field of electronics. More particularly, an embodiment of the invention relates to processing out of order transactions for mirrored subsystems.

BACKGROUND

Mirroring or backing up of data generally involves copying an original set of data from one location to one or more other locations. Generally, the original set of data may be logically split into smaller units prior to transfer to other locations. As computing systems become more complex, there may be more than one route via which each of the smaller units may be transmitted. As a result, different portions of the original set of data may arrive at the other locations out of order. To indicate successful completion of the mirroring operation, an acknowledgement may be sent to the location where the original set of data resides. However, the out of order nature of the transmissions may complicate the acknowledgement process. Also, as computing systems become more complex, the number of portions of the original set of data may significantly increase, resulting in more out of order transmissions for which an acknowledgement process needs to account.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein are generally related to processing out of order transactions for mirrored subsystems. Mirrored subsystems may include battery backed DIMMs (Dual In-line Memory Modules). For example, in an embodiment, some storage systems may mirror data via a PCIe (Peripheral Component Interconnect (PCI) express) bus (e.g., in accordance with PCIe Specifications, Revision 2.0, 2006, available from the PCI Special Interest Group, Portland, Oreg., U.S.A.) into mirrored memory on one or more redundant Central Processing Unit (CPU) nodes. Such redundancy may prevent data loss even if one of the CPU nodes has a power failure. As will be discussed herein with reference to FIGS. 1-5, the redundancy may be achieved with a protocol that ensures successful data mirroring, without impacting system write performance while waiting for the acknowledgement.

Figure 1:
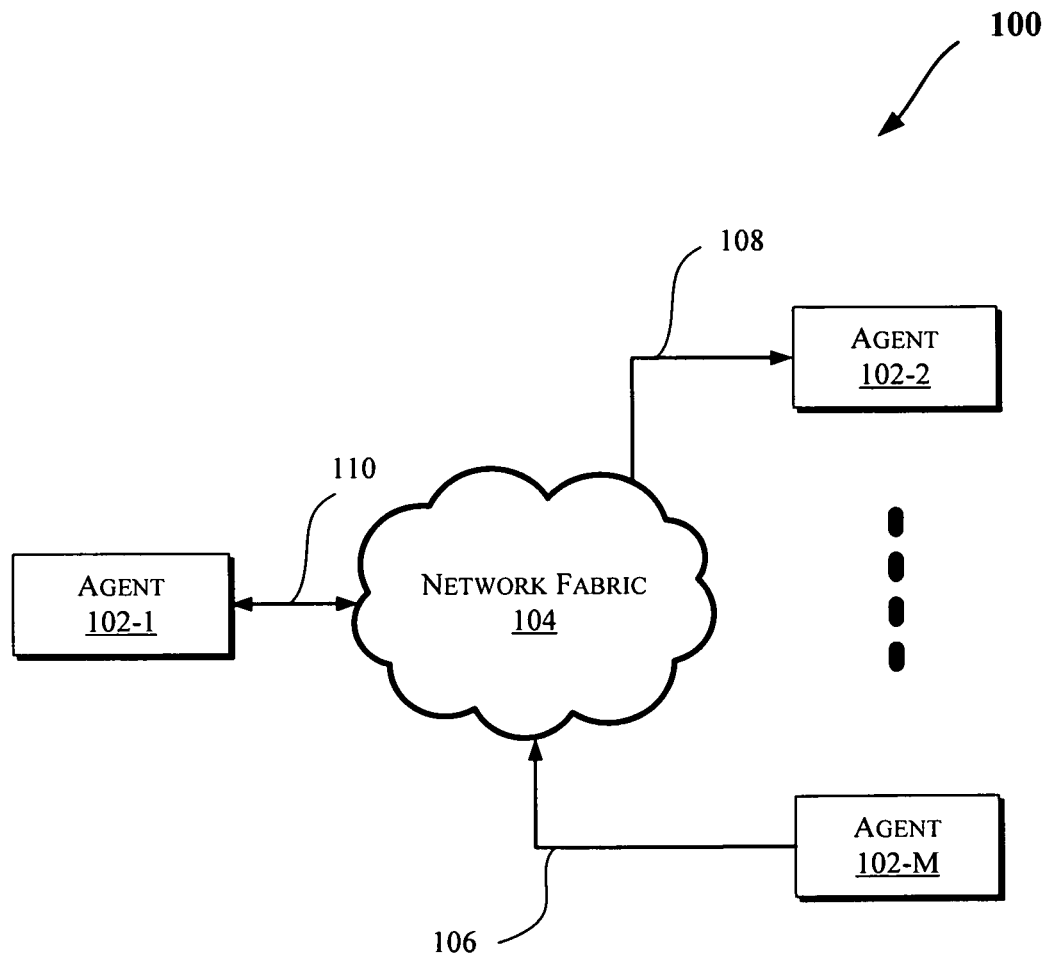
FIG. 1 illustrates a computing system including one or more agents and a network fabric, which may be utilized to implement various embodiments of the invention.

Various computing systems may be used to implement some embodiments of the invention, discussed herein, such as the systems discussed with reference to FIGS. 1-2 and 4-5. More particularly, FIG. 1 illustrates a block diagram of a computing system 100, according to one embodiment of the invention. The system 100 may include one or more agents 102-1 through 102-M (collectively referred to herein as "agents 102" or more generally "agent 102"). In one embodiment, one or more of the agents 102 may be any of the components of a computing system, such as the computing systems discussed with reference to FIGS. 4-5.

As illustrated in FIG. 1, the agents 102 may communicate via a network fabric 104. In one embodiment, the network fabric 104 may include a computer network that allows various agents (such as computing devices) to communicate data. The network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules or DIMMs (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

The system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
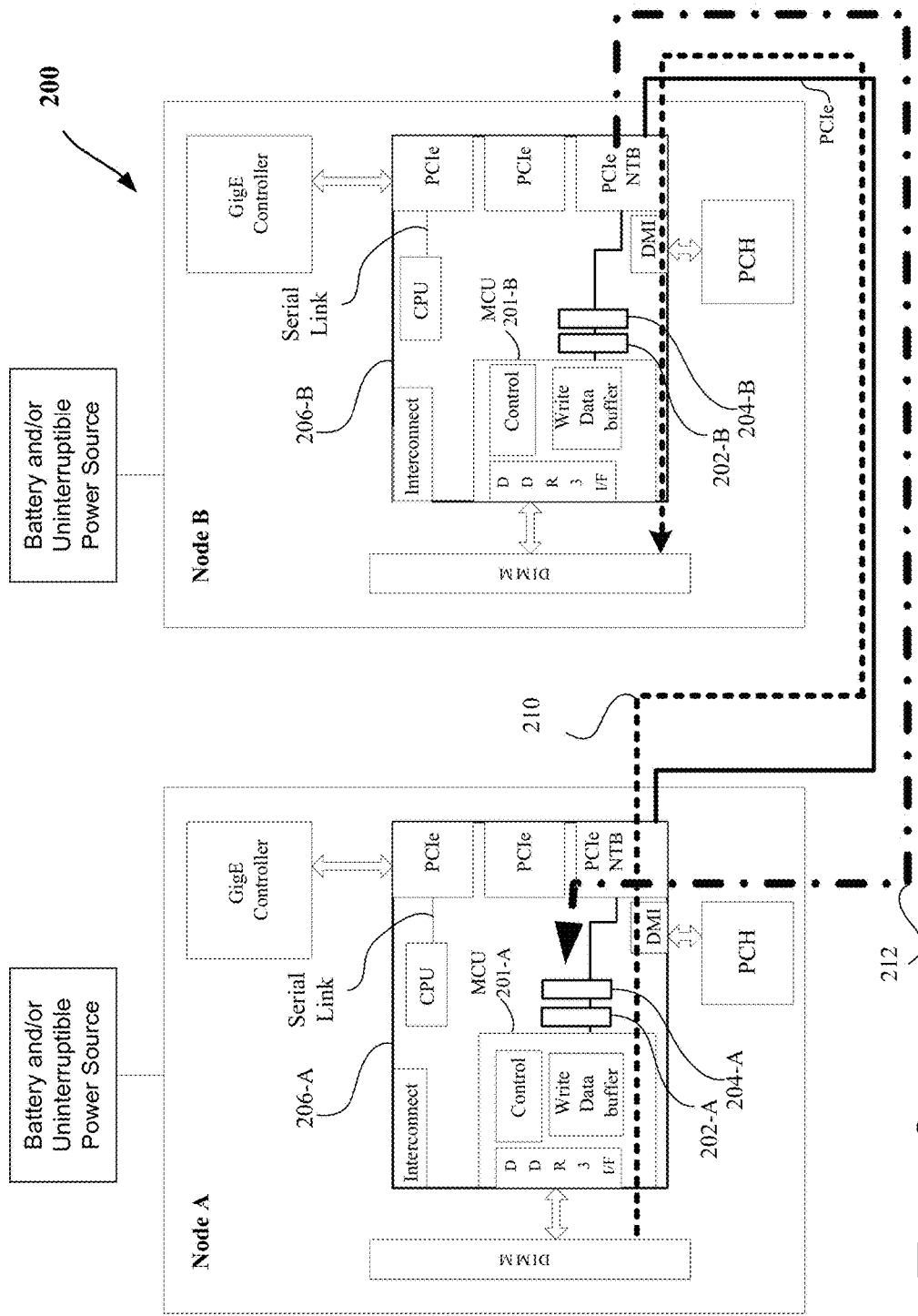
FIG. 2 illustrates a computing system including a plurality of nodes, which may be utilized to implement various embodiments of the invention.

FIG. 2 illustrates a block diagram of an embodiment of a computing system 200. As shown in FIG. 2, system 200 may include a Node A and a Node B. Each node may include one or more components (such as agents 102 discussed with reference to FIG. 1) including, for example, a Gigabit Ethernet (GigE) controller or another type of a network controller for communication over a network, a DIMM to store data (where the DIMM may or may not be provided on the same integrated circuit semiconductor device as one or more other components of each node), a Peripheral Control Hub (PCH) to couple peripherals to the nodes(s), and Direct Media Interface (DMI) to provide an interface between the PCH and integrated portion (206-A/206-B) of the nodes. In one embodiment, each of the integrated portions 206-A or 206-B may be provided on a single integrated circuit (IC) semiconductor device or die. Each portion 206-A/206-B may include a CPU to process data (including one or more processor cores), one or more PCIe interfaces to communicate with other nodes, components, or network(s), interconnect to couple components of each node to each other (which may be a point-to-point or serial interconnect in some embodiments; for example, providing a serial link between the CPU and PCIe interface(s)), and a memory control unit (MCU) 201-A/ 201-B to perform memory-related operations. Each MCU 201-A/201-B may include a memory (such as DDR3 (Double Data Rate 3) memory shown in FIG. 2) to store data, control logic (labeled as "Control" in FIG. 2) to control operations (such as read or write) of the MCU such as operations on the DIMM (e.g., via DDR3), a write data buffer to buffer write operations directed at the DIMM (e.g., via DDR3) associated with the memory, a cache 202-A/202-B to store information about input/output (I/O) write operations (e.g., such as write operations associated with mirroring of data), and a register 204-A/204-B). The cache 202-A/202-B and/or register 204-A/204-B may be located or stored in locations other than inside the MCU in some embodiments. Also, the cache 202-A/202-B may be kept coherent with other caches in system 200 and/or caches within processors/CPUs (such as discussed with reference to FIG. 4 or 5). Moreover, these caches may allow for ownership of multiple cache lines on PCIe write operations and a mechanism to write back the data once PCIe ordering rules have been met.

As shown in FIG. 2, the DIMM of Node A (or a portion of it) may be mirrored (as indicated by the dashed line 210) to the DIMM of Node B via PCIe Non-Transparent Bridges (NTBs) of nodes A and B. For example, one or more write operations may be performed from the DIMM of Node A to the DIMM of Node B, followed by a special transaction. The write operations are stored/cached in cache 202-B prior to being written to the DIMM of Node B. As will be further discussed with reference to FIG. 3, upon receipt of the special transaction or packet from Node A at Node B, register 204-B may be updated with a snapshot of the state of the cache 202-B (e.g., each bit in the register 204-B indicating whether a corresponding line or block in the cache 202-B is invalid/empty or otherwise valid/owned). After all write operations prior to the special transaction are processed (e.g., committed or written to the DIMM of Node B, where at least some of these operations are committed to the DIMM of Node B out of order), Node B may send an acknowledgement (as indicated by the dashed-dotted line 212) to Node A. Also, in some embodiments, the DIMMs of Node A and/or Node B may be coupled to one or more uninterruptible power sources and/or battery packs such that data stored therein is protected even after a power failure.

Furthermore, the special transaction may be a posted transaction with a posted response, which in general consumes fewer resources than a read transaction used in some solutions that is non-posted. Moreover, in some implementations that use a shared bus (e.g., front-side bus), a mechanism (such as a read operation) may ensure all previous write operations are committed to memory (i.e., flushing any write cache such as cache 202-B). However, in coherent point-to-point systems (such as system 100 of FIG. 1), the write operations may be performed out of order; hence, there is no guarantee that all previous write operations would be pushed to memory even after a read operation. In one embodiment, to provide the special transaction as a posted transaction, a one-bit register (or a designated location in any of the memory devices of system 200) may be updated (e.g., by software). In turn, logic (such as control logic of MCU 201-B or other logic in Node B (not shown)) may detect the updating (e.g., an edge, or change between a 0 or 1 in the register) and cause the register 204-B to be updated with information about cache lines (or blocks) of the cache 202-B.

Figure 3:
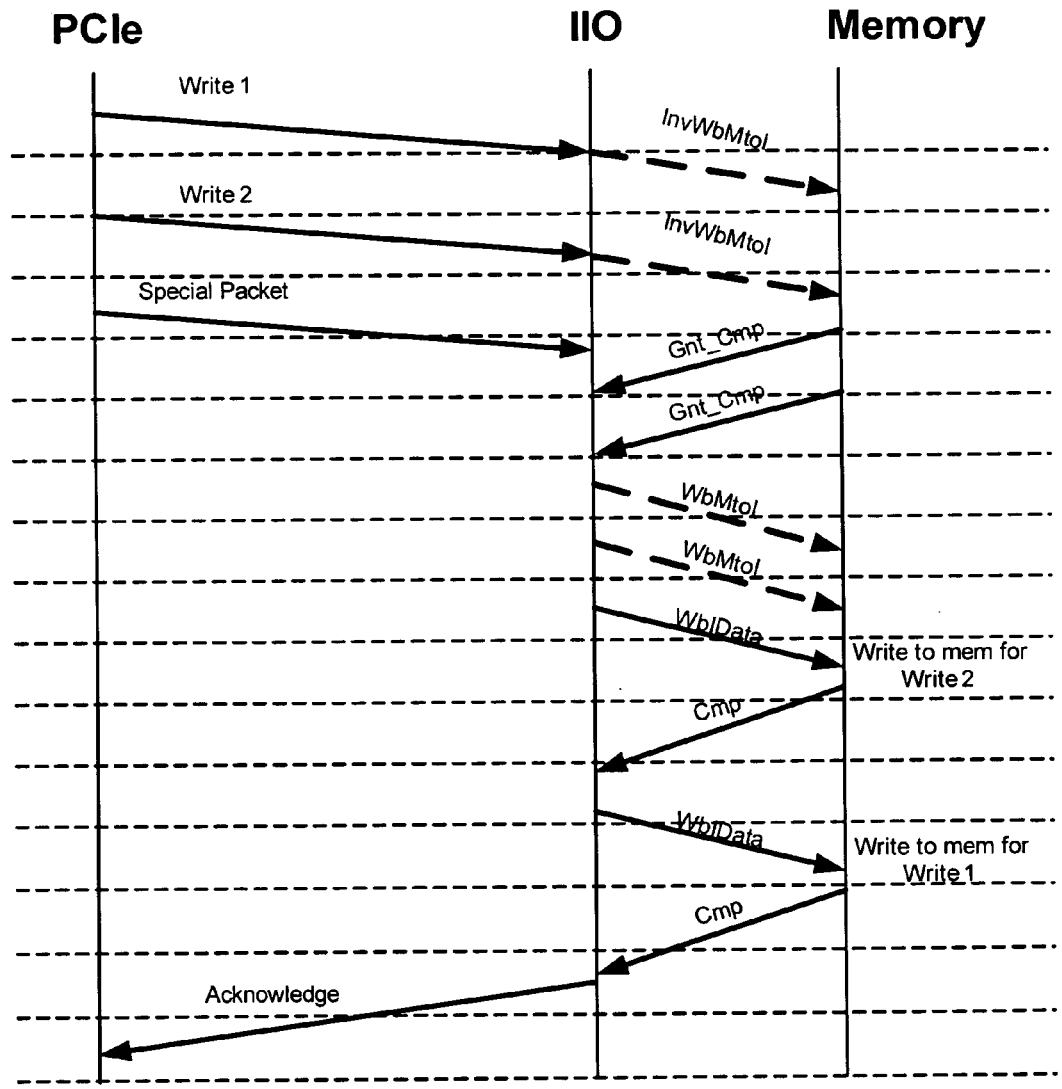
FIG. 3 illustrates a flow diagram of transactions between PCIe (Peripheral Component Interconnect express), Integrated I/O (IIO), and memory, according to an embodiment.

FIG. 3 illustrates a flow diagram of transactions between PCIe, Integrated I/O (IIO), and memory, according to an embodiment. In one embodiment, PCIe of FIG. 3 may be the same or similar to the PCIe coupling between PCIe NTB of Node A of FIG. 2. The IIO of FIG. 3 may be the same or similar to the PCIe NTB of Node B and MCU 201-B of FIG. 2, while "memory" may be the same or similar to the DIMM of Node B of FIG. 2. Also, dashed arrows in FIG. 3 indicate operations that are guaranteed to complete in order which is required to guarantee PCI ordering rules. Also, FIG. 3 is a simple example describing the mechanism for 2 writes, but other embodiments of the invention may work with N number of writes followed by a Special Packet or transaction, followed by M number of subsequent writes, etc.

As illustrated in FIG. 3, two PCIe write operations (Write 1 and Write 2) are sent to memory. In this example, the data being written to the DIMM will occur in different order than written on the PCIe bus due to unordered data channels. Hence, WbIData (Writeback data, e.g., indicating downgrade to I (invalid) state (which means that the data is being written from the cache and this cache is now in the I-state)) packets may occur out of order and Acknowledge for Write 1 and Write 2 are to be sent after both write operations are committed to memory.

Moreover, once the write operations are received at the IIO, InvWbMtoI (invalidate writeback and downgrade from M (modified) to I, e.g., request E (exclusive) state without data) packets are sent to memory and the cache 202-B at Node B is updated with data from these write operations. In response to receipt of the special packet or transaction at IIO, a snapshot of state of the cache 202-B is stored in the register 204-B. The memory responds InvWbMtoI by sending Gnt_Cmp (grant E state ownership without data) packets. After receiving Gnt_Cmp's, the IIO issues InvWbMtoI (downgrade from M (modified) to I, e.g., to signal an in-flight WbIData message is about to be sent) packets and WbIData packets. Upon receipt of Cmp (completed, e.g., indicating that WbIData has been received by the memory) packets at IIO, the register 204-B is updated (e.g., indicating invalidity or an empty status of a corresponding line or block in the cache 202-B). Once register 204-B indicates all entries of the cache 202-B as per the most recent snapshot) are empty/invalidated, the acknowledge packet is sent to the PCIe NTB of Node A.

In one embodiment, any write operations occurring after the special packet or transaction may be ignored for the purposes of tracking until an acknowledgment is sent for any pending special packets or transactions. Alternatively, for multiple ports, the snapshot logic, cache, register, etc. may be replicated.

Accordingly, in some embodiments, a protocol to mirror data may provide for high memory bandwidth between the CPU nodes (e.g., to provide efficiency and/or speed through a sufficient number of write operations) and it may also provide for an acknowledgement when these write operations have been committed to the redundant memory. Moreover, in such systems, a large number of write operations are mirrored, followed by a special transaction (snapshot) that causes an acknowledgement to be returned once the previous write operations (issued prior to the snapshot) have been committed to the battery backed memory. After the special transaction is sent, the mirrored write operations may continue; however, these subsequent write operations are not considered protected until the next special transaction is sent and an acknowledgement is received. Accordingly, to provide for high bandwidth, no data stall may be introduced during the mirroring.

Figure 4:
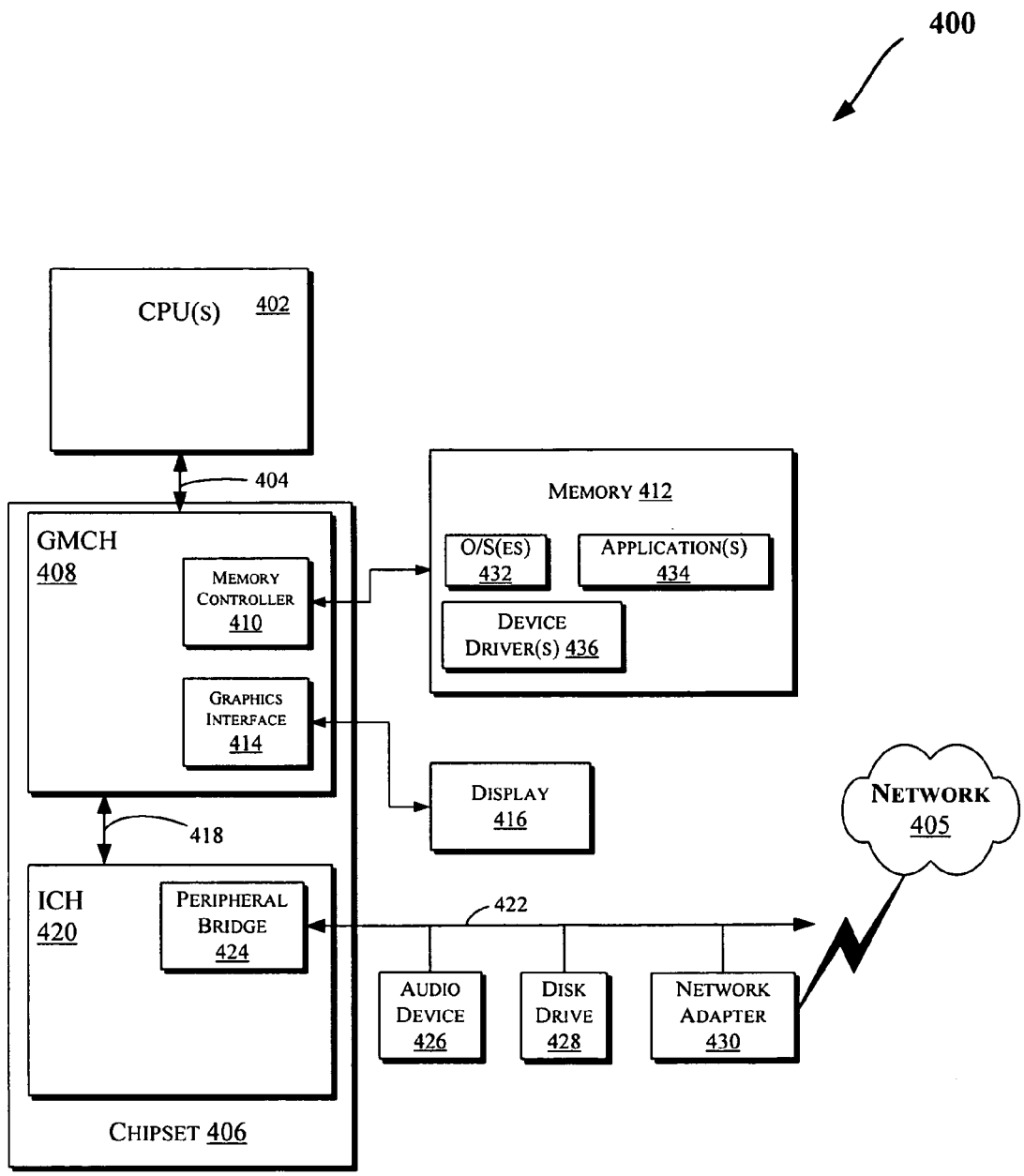
FIG. 4 illustrates a computing system including one or more processors, a chipset, and memory coupled to an interconnection network, which may be utilized to implement various embodiments of the invention.

FIG. 4 illustrates a block diagram of an embodiment of a computing system 400. One or more of the agents 102 of FIG. 1 may comprise one or more components of the computing system 400. Also, in at least one embodiment, snapshot logic, cache, and registers discussed with reference to FIGS. 1-3 may be provided in the system 400, e.g., within various components of system 400 such as Graphics Memory Control Hub (GMCH) 408, I/O Control Hub (ICH) 420, etc. The computing system 400 may include one or more central processing unit(s) (CPUs) 402 (which may be collectively referred to herein as "processors 402" or more generically "processor 402") coupled to an interconnection network (or bus) 404. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core, or multi-core, design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches, which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 400. Additionally, such cache(s) may be located in various locations (e.g., inside other components of the computing systems discussed herein, including systems of FIG. 1-2 or 5).

A chipset 406 may additionally be coupled to the interconnection network 404. Further, the chipset 406 may include a graphics memory control hub (GMCH) 408. The GMCH 408 may include a memory controller 410 that is coupled to a memory 412. The memory 412 may store data, e.g., including sequences of instructions that are executed by the processor 402, or any other device in communication with components of the computing system 400. Also, in one embodiment of the invention, the memory 412 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The GMCH 408 may further include a graphics interface 414 coupled to a display device 416 (e.g., via a graphics accelerator in one embodiment). The graphics interface 414 may be coupled to the display device 416 via an accelerated graphics port (AGP). In one embodiment of the invention, the display device 416 (such as a flat panel display) may be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 may couple the GMCH 408 to an input/output control hub (ICH) 420. The ICH 420 may provide an interface to input/output (I/O) devices coupled to the computing system 400. The ICH 420 may be coupled to a bus 422 through a peripheral bridge (or controller) 424, such as a peripheral component interconnect (PCI) bridge that may be compliant with the PCI Express (PCIe) specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. Further, the bus 422 may comprise other types and configurations of bus systems. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a Network Interface Card (NIC) in one embodiment). The network adapter 430 or other devices coupled to the bus 422 may communicate with the chipset 406. Also, various components (such as the network adapter 430) may be coupled to the GMCH 408 in some embodiments of the invention. In addition, the processor 402 and the GMCH 408 may be combined to form a single chip. In one embodiment, the memory controller 410 may be provided in one or more of the CPUs 402. Further, in one embodiment, GMCH 408 and ICH 420 may be combined into a Peripheral Control Hub (PCH).

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 may include one or more of the following: an operating system (O/S) 432, application 434, and/or device driver 436. The memory 412 may also include regions dedicated to Memory Mapped I/O (MMIO) operations. Programs and/or data stored in the memory 412 may be swapped into the disk drive 428 as part of memory management operations. The application(s) 434 may execute (e.g., on the processor(s) 402) to communicate one or more packets with one or more computing devices coupled to the network 405. In one embodiment, a packet may be a sequence of one or more symbols and/or values that may be encoded by one or more electrical signals transmitted from at least one sender to at least one receiver (e.g., over a network such as the network 405 or other channel).

In one embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In one embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers in the memory 412 that are to be processed, e.g., via the protocol stack.

The network 405 may include any type of computer network. The network adapter 430 may further include a direct memory access (DMA) engine, which writes packets to buffers (e.g., stored in the memory 412) assigned to available descriptors (e.g., stored in the memory 412) to transmit and/or receive data over the network 405. Additionally, the network adapter 430 may include a network adapter controller, which may include logic (such as one or more programmable processors) to perform adapter related operations. In one embodiment, the adapter controller may be a MAC (media access control) component. The network adapter 430 may further include a memory, such as any type of volatile/nonvolatile memory (e.g., including one or more cache(s) and/or other memory types discussed with reference to memory 412).

Figure 5:
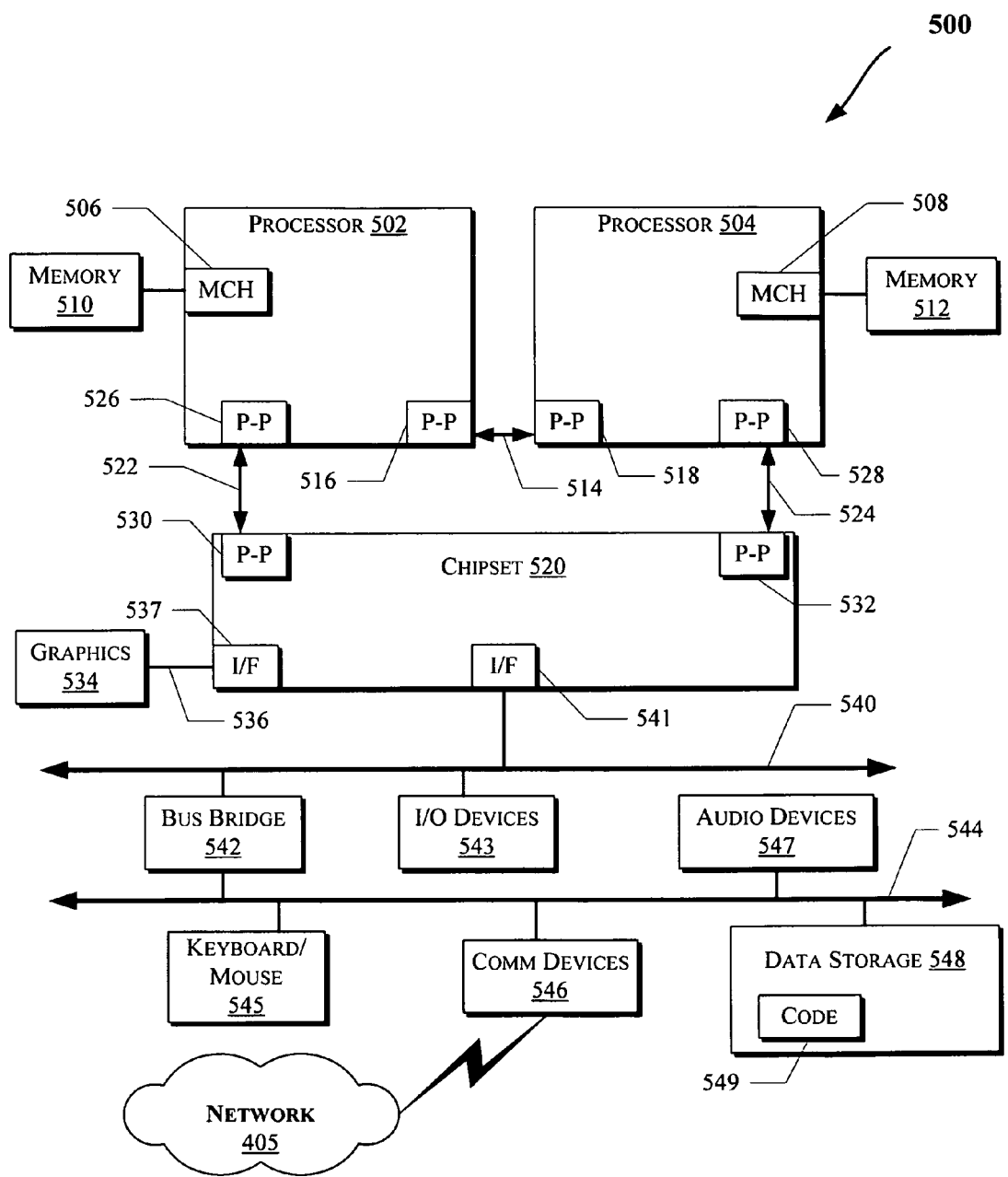
FIG. 5 illustrates a computing system arranged in a point-to-point configuration, according to one embodiment of the invention.

FIG. 5 illustrates a computing system 500 that is arranged in a point-to-point (PtP) or P-P configuration, according to one embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500. Also, one or more of the agents 102 of FIG. 1 may comprise one or more components of the computing system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. As shown in FIG. 5, the processors 502 and 504 (or other components of system 500 such as chipset 520, I/O devices 543, etc.) may also include one or more cache(s) such as those discussed with reference to FIGS. 1-4.

In one embodiment, the processors 502 and 504 may be one of the processors 402 discussed with reference to FIG. 4. The processors 502 and 504 may exchange data via a point-to-point (PtP) interface 514 using PtP or P-P interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, snapshot logic, cache, and registers discussed with reference to FIGS. 1-4 may be provided in the system 500, e.g., within various components of system 500 such as the chipset 520, I/O devices 543, communication devices 546, etc. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with the bus 540 using a PtP or P-P interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 405), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first device coupled to a first memory, wherein the first memory stores data from a second memory, coupled to a second device, in response to a plurality of write operations issued by the second device;
the first device having a cache to store data corresponding to the plurality of write operations prior to writing the data corresponding to the plurality of write operations to the first memory; and
a register to store a state of the cache in response to receipt of a special transaction, wherein the first device transmits an acknowledgement to the second device in response to an indication based on content of the register that one or more of the plurality of write operations, which were issued prior to receipt of the special transaction, have been written to the first memory and wherein any write operations occurring after the special transaction are ignored for tracking purposes until an acknowledgement is sent for any pending special transactions, wherein the special transaction causes an acknowledgment to be returned once all previous write operations issued prior to the special transaction have been committed to one of the first memory or the second memory, wherein the apparatus further comprises one or more uninterruptible power sources or batteries to supply power to the one of the first memory or the second memory such that data stored therein is protected even after a power failure.

2. The apparatus of claim 1, wherein the first device writes data corresponding to at least some of the plurality of write operations to the first memory out of order.

3. The apparatus of claim 1, wherein the first device includes a PCIe (Peripheral Component Interconnect express) interface to communicate via a PCIe bus to a PCIe interface of the second device.

4. The apparatus of claim 3, wherein the first device includes a processor, and the processor and the PCIe interface of the first device communicate via a serial link.

5. The apparatus of claim 1, wherein the first device comprises a processor having a processor cache, wherein the cache of the first device and the processor cache are coherent.

6. The apparatus of claim 1, wherein the first memory and the first device are on the same integrated circuit die.

7. The apparatus of claim 1, wherein the cache and the register are on the same integrated circuit die.

8. The apparatus of claim 1, wherein, during storage of data by the first memory from the second memory, no data stall is introduced.

9. A method comprising:
storing data from a first memory, coupled to a first device, into a second memory, coupled to a second device, in response to a plurality of write operations issued by the first device;
storing data corresponding to the plurality of write operations in a cache of the second device prior to writing the data corresponding to the plurality of write operations to the second memory; and
storing a state of the cache in a register in response to receipt of a special transaction,
wherein the second device transmits an acknowledgement to the first device in response to an indication based on content of the register that one or more of the plurality of write operations, which were received at the second device prior to receipt of the special transaction, have been written to the second memory and wherein any write operations occurring after the special transaction are ignored for tracking purposes until an acknowledgement is sent for any pending special transactions, wherein the special transaction causes an acknowledgment to be returned once all previous write operations issued prior to the special transaction have been committed to one of the first memory or the second memory, wherein the method further comprises supplying power to the one of the first memory or the second memory from an uninterruptible power supply or a battery pack in response to a power failure.

10. The method of claim 9, further comprising writing data corresponding to at least some of the plurality of write operations to the second memory out of order.

11. The method of claim 9, further comprising coupling the first device to the second device via a PCIe (Peripheral Component Interconnect express) bus.

12. The method of claim 9, further comprising coupling a processor of the second device to a PCIe interface of the second device via a serial link.

13. The method of claim 9, further comprising keeping the cache and a cache of a processor of the second device coherent.

14. A system comprising:
a first memory to store data from a second memory;
a display device to display information corresponding to the stored data; and
a first device coupled to the first memory, wherein the second memory is coupled to a second device, wherein the first memory is to store the data from the second memory in response to a plurality of write operations issued by the second device;
the first device having a cache to store data corresponding to the plurality of write operations prior to writing the data corresponding to the plurality of write operations to the first memory; and
a register to store a state of the cache in response to receipt of a special transaction,
wherein the first device transmits an acknowledgement to the second device in response to an indication based on content of the register that one or more of the plurality of write operations, which were issued prior to receipt of the special transaction, have been written to the first memory and wherein any write operations occurring after the special transaction are ignored for tracking purposes until an acknowledgement is sent for any pending special transactions, wherein the special transaction causes an acknowledgment to be returned once all previous write operations issued prior to the special transaction have been committed to one of the first memory or the second memory, wherein the system further comprises one or more uninterruptible power sources or batteries to supply power to the one of the first memory or the second memory such that data stored therein is protected even after a power failure.

15. The system of claim 14, wherein the first device writes data corresponding to at least some of the plurality of write operations to the first memory out of order.

16. The system of claim 14, wherein, during storage of data by the first memory from the second memory, no data stall is introduced.

* * * * *